United States Patent [19]

Wolters et al.

[11] 4,392,465
[45] Jul. 12, 1983

[54] SELF-IGNITING INTERNAL COMBUSTION ENGINE WITH A ROTATIONALLY SYMMETRICAL PISTON TROUGH

[75] Inventors: Gerhard Wolters, Gaggenau; Wilhelm Wagner, Stuttgart, both of Fed. Rep. of Germany

[73] Assignee: Daimler-Benz Aktiengesellschaft, Fed. Rep. of Germany

[21] Appl. No.: 281,028

[22] Filed: Jul. 7, 1981

[30] Foreign Application Priority Data

Jul. 9, 1980 [DE] Fed. Rep. of Germany ....... 3025943
Apr. 22, 1981 [DE] Fed. Rep. of Germany ....... 3115933

[51] Int. Cl.³ .......................................... F02B 19/08
[52] U.S. Cl. .................................... 123/263; 123/276; 123/282
[58] Field of Search ............... 123/262, 263, 275, 276, 123/281, 285, 282

[56] References Cited

U.S. PATENT DOCUMENTS

| | | | |
|---|---|---|---|
| 2,975,773 | 3/1961 | Meurer | 123/276 X |
| 3,386,421 | 6/1968 | Hoffmann et al. | 123/276 |
| 4,207,843 | 6/1980 | List et al. | 123/276 X |

FOREIGN PATENT DOCUMENTS

| | | | |
|---|---|---|---|
| 1032597 | 4/1960 | Fed. Rep. of Germany. | |
| 1805043 | 5/1970 | Fed. Rep. of Germany | 123/276 |
| 2652662 | 3/1978 | Fed. Rep. of Germany. | |
| 834777 | 12/1938 | France | 123/276 |
| 1249519 | 10/1971 | United Kingdom. | |

OTHER PUBLICATIONS

Automotive Engineering vol. 86, No. 5, May 1978, pp. 42-47.

Primary Examiner—Tony M. Argenbright
Attorney, Agent, or Firm—Craig & Burns

[57] ABSTRACT

A self-igniting internal combustion engine which includes at least one piston having a rotational symmetrical piston trough arranged therein. The piston trough has a conical side wall and an inlet port which is less than a largest diameter of the piston trough. An eccentrically arranged injection nozzle is provided for injecting fuel in a wall wetting phase into the piston trough. At least one fuel jet from the injection nozzle impinges approximately in a plane centrally onto the side wall. To avoid a wetting of the bottom of the trough with still liquid fuel, an annular bead is provided having a sharp annular bead edge. A collar is arranged at the neck of the inlet port, with the collar constituting a discontinuous transistion to the inlet port and causing in the area of the collar a swirl formation counteracting the wall-wetting fuel rising toward the inlet port.

4 Claims, 4 Drawing Figures

SELF-IGNITING INTERNAL COMBUSTION ENGINE WITH A ROTATIONALLY SYMMETRICAL PISTON TROUGH

The present invention relates to an internal combustion engine and, more particularly, to a self-igniting internal combustion engine which is provided with a rotational symmetrical piston trough having a flat bottom cross section, being well rounded at the rim, and having conical side walls wherein an inlet port is smaller than a largest diameter of the piston trough, and with a fuel injection nozzle directing injected fuel in a wall wetting fashion into the piston trough.

In self-igniting internal combustion engines of the aforementioned type, a turbulent motion of the entering and compressed air is produced in most cases by means of conventional measures. Fuel injection takes place in a direction of the air movement due to a suitable choice of the nozzle position and jet orientation.

In Auslegeschrift No. 1,032,597, an internal combustion engine of the aforementioned type is proposed wherein the injection nozzle, operating with a widely fanned spray, is arranged in such a manner that a cone of the spray, extending in a direction of the axis of the injection nozzle, impinges in free air upon the edge of the piston trough so that only a portion of the fuel spray enters the piston trough.

In German Pat. No. 864,475, a further arrangement is proposed wherein the piston trough has a trapezoidal cross sectional shape as viewed in a longitudinal direction, with the injection nozzle being extended so far that it lies within a neck of the combustion chamber recess or trough. In this proposed construction fuel injection takes place in a fan shape by means of a multiple orifice injection nozzle.

Additionally, spherical, cylindrical, and hyperboloidal piston troughs have also been proposed for internal combustion engines.

A disadvantage of all of the aforementioned piston troughs reside in the fact that the configurations thereof are unsatisfactory with respect to exhaust gas emission and noise emission. The reason for the disadvantages reside in the fact that, on the one hand, although the wall wetting feature provides for the attainment of a more or less satisfactory and relatively low noise combustion process, on the other hand, the still uncombusted fuel reaches the relatively cold rim and bottom of the piston trough, especially at low rotational speed as well as during idling and in a medium speed range during a partial load operation and, at this location, particularly in a center of the swirl, the uncombusted fuel is intermixed inadequately with the combustion air so that only an insufficient combustion process is carried out.

Additionally, it has also been determined that, in spite of a wall wetting injection oriented obliquely from the top toward the bottom and in spite of an obliquely downly inclined side wall of the piston trough, fuel does undesirably creep upwardly along the inclined truncated cone-shaped side walls so as to wet the end face of the piston. This happens due to the vigorous impingement of the injection jets and the upwardly oriented flow resulting from the incipient expansion stroke. Consequently, these fuel particles likewise experience inadequate combustion. The incomplete combustion process of the fuel adhering to the trough bottom and to the end face of the piston is additionally negatively affected by the cooling due to expansion.

The aim underlying the present invention essentially resides in providing a self-igniting internal combustion engine which enables the carrying out of a combustion process which is lower in noise while nevertheless providing for a satisfactory fuel utilization.

In accordance with advantageous features of the present invention, the continuous annular bead, projecting pointedly in cross section, is provided in a transitional zone between a side wall and bottom of the piston trough.

By virtue of the above-noted features of the present invention, a wetting of a bottom of the piston trough and of an end face of the piston with fuel and the disadvantages associated with such a wetting are avoided and/or reduced. More particularly, with an injection which takes place in a first phase in a restrained and air-distributed fashion, the fuel particles are caught by the swirl or eddy current and are thoroughly mixed with the combustion air. After an elapse of the ignition delay time and full injection in the second phase, the entire fuel jets wet the side walls and form a film which, due to kinetic energy and the inclined side wall, flows off to the largest extent in a direction of a bottom of the piston trough. During the flowing off process of the fuel film, a continuous intermixing with the combustion air takes place by the swirl effect until finally the annular bead has been reached and the residual fuel film vaporizes by virtue of the hot and pointedly projecting annular bead edge. The fuel film is torn off and is entirely consumed by the swirl, without the fuel particles wetting the actual bottom of the piston trough. Consequently, in addition to achieving a high degree of efficiency due to an almost complete combustion, a high power yield is ensured with maximum utilization of the air charge and, above all, any noise emission is reduced to a minimum.

Advantageously, in accordance with further features of the present invention, an apex of the cross section of the annular bead may be formed by two bead flanks which converge toward each other approximately at a right angle.

In accordance with further features of the present invention, the annular bead flank facing the inlet port may be disposed in cross section approximately in parallel to the piston top in a passover with a radius of about 2–5 mm into the side wall so that a satisfactory flowing off of the wall-wetting fuel toward the annular bead edge and a definite rupturing of the fuel film on the hot rim of the annular bead are obtained.

Advantageously, a continuous edge of the annular bead may, in accordance with the present invention, extend in a plane in parallel to the piston top.

Moreover, a neck of the inlet port may, according to the present invention, exhibit a continuous collar which projects radially inwardly with a transition from the side wall to the inside of the collar being in the form of an edge or angular portion or it may have a maximum transition radius of about 3 mm.

By virtue of the noted features of the present invention, the other portion of the still liquid fuel film, which creeps upwardly along the side wall, may be retained by the projecting continuous collar and/or may be deflected into an approximately horizontal plane. The deflection of the still liquid fuel film effects a damming up in the flow direction of the wall wetting fuel particles so that sufficient time is available for swirling the fuel particles evaporating therefrom into the air/fuel mixture, with the mixture sweeping past due to a squeeze or compression flow effect.

By virtue of the formation of the sharp edge at the transition from the collar to the inlet port the tearing off of fuel particles is enhanced. Moreover, by the constricting discontinuous transistion to the inlet port, and eddy is formed which runs in opposition to the general flow and counteracts the wall wetting fuel rising upwardly along the side wall of the piston trough, detaches this fuel from the side wall, and combines this fuel with the general flow thereby resulting in improved mixture formation and a combustion of this proportion of the fuel.

In accordance with further features of the present invention, an axial spacing of a plane of the annular bead flank from a bottom of the piston trough may correspond to approximately 12-33% of the total depth of the piston trough so that thereby a tearing off of the residual fuel film takes place over an entire circumference under identical flow conditions.

In order to ensure a safe tearing off of the residual fuel film at the annular bead edge due to turbulence, advantageously the diameter of the annular bead edge may correspond approximately to 0.9-1.1 times a diameter of the inlet port, i.e., about 0.38-0.4 times the diameter of the piston.

Moreover, in accordance with the present invention, the annular bead flank which lies facing a bottom of the piston trough may pass over, in cross section, with a radius of about 22-35% of a total depth of the trough into the bottom of the trough.

According to the present invention, an injection nozzle may be associated with the piston trough, the jet or jets of the nozzle may be directed onto a side wall of the piston trough and a point of impingement of the injection jet may lie axially about in a middle area between the annular bead edge and the top of the piston.

By shifting the injection nozzle in an axial direction, a point of impingement of the injection jet or jets may be varied so that it is possible of affect the combustion characteristics to a certain extent.

Moreover, it is also possible in accordance with the present invention to arrange an injection nozzle in an eccentric position with respect to the piston trough but still within the inlet port thereof.

Advantageously, according to the present invention, the conical angle or angle of inclination of the side walls may be about between 7%-15%. With a larger conical angle or angle of inclination, the turbulence is lessened or reduced; however, such a reduction in turblence may be disadvantageous for obtaining a satisfactory air/fuel intermixing.

In accordance with still further features of the present invention, a total depth of the piston trough may be approximately 0.6-0.8 times a diameter of the inlet port.

Accordingly, it is an object of the present invention to provide a self-igniting internal combustion engine which avoids, by simple means, shortcomings and disadvantages encountered in the prior art.

Another object of the present invention resides in providing a self-igniting internal combustion engine which enhances the combustion process of the engine and reduces exhaust gas emission.

Yet another object of the present invention resides in providing a self-igniting internal combustion engine which has a high degree of efficiency and a high power yield.

A still further object of the present invention resides in providing a self-igniting internal combustion engine which reduces noise emission to a minimum.

A still further object of the present invention resides in providing a self-igniting internal combustion engine which functions realiably under all load conditions of the engine.

Yet another object of the present invention resides in providing a self-igniting internal combustion engine which has an improved mixture formation.

These and other objects, features, and advantages of the present invention will become more apparent from the following description when taken in connection with the accompanying drawing which shows, for the purposes of illustration only, two embodiments in accordance with the present invention, and wherein.

Figure 1:
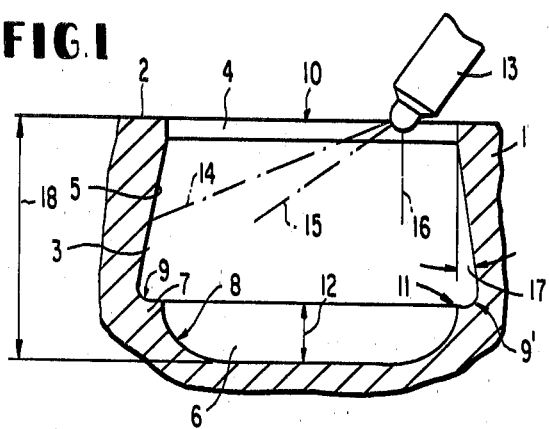
FIG. 1 is a partial cross sectional fragmentary view of a piston top with an injection nozzle arranged in cylinder head in an internal combustion engine constructed in accordance with the present invention.
Figure 2:
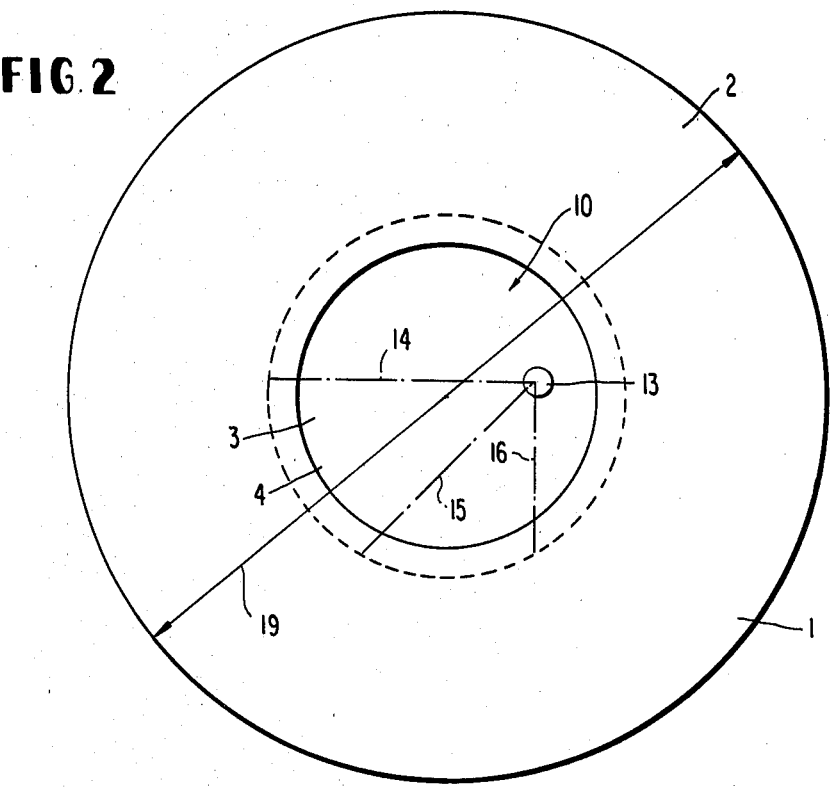
FIG. 2 is a top plan view of the piston and injection nozzle of FIG. 1.

Referring now to the drawings wherein like reference numerals are used throughout the various views to designate like parts and, more particularly, to FIGS. 1 and 2, according to these Figures, an internal combustion engine includes a plurality of pistons with each piston having a top or crown 2 and a rotationally symmetrical piston trough 3 formed from a cylindrical neck 4 and adjoining conical side walls 5. A continuous annular bead 7, projecting pointedly in cross section, is provided between the side walls 5 and a bottom 6 of the trough 3.

The annular bead 7 is formed by two annular bead flanks respectively designated by the reference numerals 8, 9, which converge toward each other at approximately a right angle, the annular bead flank 9 faces an inlet port generally designated by the reference numeral 10 of the piston trough 3. The annular bead flank 9 extends, as viewed in cross section, approximately in parallel with the piston top or crown 2 and passes over into the side wall with a radius generally designated by the reference 9' of about 2-5 mm. The annular bead 7 includes a continuous edge generally designated by the reference numeral 11 which extends in a plane in parallel to the bottom 6 of the piston trough 3. An axial spacing 12 of the plane of the annular bead flank 9 from the bottom 6 of the trough is about 12-33% of a total depth 18 of the piston trough 3. Advantageously, the diameter of the continuous annular bead edge 11 is approximately 0.9-1.1 times a diameter of the inlet port 10, with the diameter of the inlet port 10 being about 0.38-0.4 times the piston diameter 19.

A bottom 6 of the piston trough 3 passes over with a radius of about 20-35% of the total depth 18 of the piston trough 3 into the annular bead flank 8.

Advantageously, an injection nozzle 13 is associated with the piston trough 3 with a jet or jets 14, 15, 16 of the injection nozzle 13 being wholly oriented or arranged toward the side wall 5 of the piston trough 3 and impinging about axially in a center between the annular bead flank 11 and the piston top or crown 2. The injection nozzle 13 may be arranged, in a conventional manner, eccentrically to the piston trough 3 but yet be disposed within the inlet port 10 of the piston trough 3. In order to maintain turbulence, advantageously the conical angle or angle of inclination 17 of the side walls 5 is limited to between about 7°–15°. However, a total height 18 of the piston trough 3 is not to be larger than 0.6–0.8 times a diameter of the inlet port 10 in the arrangement of FIGS. 1 and 2.

Figure 3:
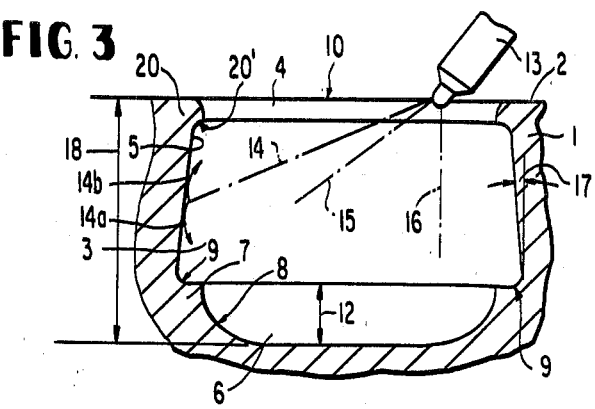
FIG. 3 is a partial cross sectional fragmentary view of a piston top with a readily inwardly projecting continuous collar for an internal combustion engine constructed in accordance with the present invention.
Figure 4:
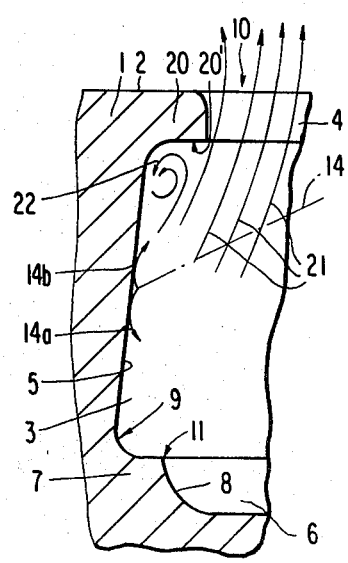
FIG. 4 is a fragmentary cross sectional view, on an enlarged scale, of a piston trough in the piston top of FIG. 3.

As shown in FIGS. 3 and 4, a collar generally designated by the reference numeral 20 passes over into the side wall 5 along an inner contour 20' with a sharp rim or with a maximum radius of about 3 mm. The fuel jets 14, 15, 16 impinging on the side wall 5 are respectively divided into components 14a, 14b, etc., with the larger component 14a being oriented downwardly toward the bottom 6 of the piston trough 3 and the smaller component 14b being oriented upwardly toward the inlet port 10. Wall-wetting fuel, which creeps undesirably in the upward direction as supported in an upward movement by an upwardly directed flow 21 dams up at the collar 20. This fuel is detached from the side wall by an eddy 22 formed at the constricted discontinuous transition to the neck 4 of the inlet port 10, with the eddy acting against the rising fuel and combining the latter with the general flow 21. The larger downwardly directed component 14a is deflected by the continuous annular bead and is torn off at the annular bead edge 11 so that it is impossible for a film of liquid wall-adhering fuel particles to be formed on the bottom 6 of the piston trough 3 or on the piston top 2.

While we have shown and described two embodiments in accordance with the present invention, it is understood that the same is not limited thereto but is susceptible of numerous changes and modifications as known to one having ordinary skill in the art and we therefore do not wish to be limited to the details shown and described herein but intend to cover all such modifications as are encompassed by the scope of the appended claims.

We claim:

1. Self-igniting internal combustion engine with a rotationally symmetrical piston trough exhibiting in cross section a flat bottom well rounded at the rim and conical sidewalls, and
   wherein the inlet opening is smaller than the largest diameter of the piston trough, and with an injection nozzle injecting into the piston trough so that the walls are wetted, characterized by the combination of the following features:

(a) the diameter of the inlet opening is about 0.35–0.43 times the piston diameter, and the total depth of the piston trough is about 0.6–0.8 times the diameter of the inlet opening;
   (b) the angle of conicity of the sidewalls is about 7–15°;
   (c) a continuously extending, projecting annular bead formed, in cross section, by two bead flanks converging approximately at a right angle is provided in the transition zone between the sidewall and the bottom, the annular bead flank of this annular bead facing the inlet opening lying, in cross section, approximately in parallel to the piston crown, and the continuously extending rim of this annular bead extending in parallel to the piston crown;
   (d) the axial spacing of the plane of the annular bead flank from the bottom of the piston trough corresponds approximately to 12–33% of the total depth of the piston trough;
   (e) the diameter of at least one annular bead flank corresponds approximately to 0.9–1.1 times the diameter of the inlet opening;
   (f) the annular bead flank facing the bottom of the piston trough passes over, in cross section, with a radius of about 22–35% of the total depth into the bottom and the annular bead flank facing the inlet opening passes over, in cross section, with a radius of about 2–5 mm into the sidewall;
   (g) the injection nozzle, arranged eccentrically to the piston trough but still within the inlet opening thereof, directs its jets onto the sidewall of the piston trough in such a way that the point of impingement of the injection jets lies axially approximately in the center between the annular bead rim and the piston crown.

2. An internal combustion engine according to claim 1, characterized in that the inlet port includes a neck, and in that a continuous collar means projecting radially inwardly is arranged in the neck of the inlet port for at least one of retaining fuel creeping upwardly along the side wall and deflecting fuel from the side walls in a substantially horizontal plane.

3. An internal combustion engine according to claim 2, characterized in that a transition portion is provided between the side walls and an inside of the collar means, and in that the transition portion is an angular surface portion.

4. An internal combustion engine according to claim 2, characterized in that the transition portion is provided between the side walls and an inside of the collar means, and in that a transition portion has a maximum radius of about 3 mm.

* * * * *